United States Patent
Yoshida

(10) Patent No.: US 8,412,761 B2
(45) Date of Patent: Apr. 2, 2013

(54) SINGLE PRECISION FLOATING-POINT DATA STORING METHOD AND PROCESSOR

(75) Inventor: Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1052 days.

(21) Appl. No.: 12/276,788

(22) Filed: Nov. 24, 2008

(65) Prior Publication Data

US 2009/0240757 A1 Sep. 24, 2009

(30) Foreign Application Priority Data

Mar. 21, 2008 (JP) .................................. 2008-073434

(51) Int. Cl.
*G06F 7/38* (2006.01)
(52) U.S. Cl. ........................................................ 708/513
(58) Field of Classification Search ........................ None
See application file for complete search history.

(56) References Cited

U.S. PATENT DOCUMENTS

| | | | |
|---|---|---|---|
| 5,740,093 A | 4/1998 | Sharangpani | |
| 5,784,588 A | 7/1998 | Leung | |
| 5,884,070 A | 3/1999 | Panwar | |
| 2002/0071387 A1 | 6/2002 | Horiguchi et al. | |
| 2009/0240757 A1 * | 9/2009 | Yoshida | 708/513 |

FOREIGN PATENT DOCUMENTS

| | | |
|---|---|---|
| EP | 0 184 806 | 6/1986 |
| EP | 0 794 488 | 9/1997 |
| JP | 2002-185501 | 6/2002 |
| KR | 10-2006-0066081 A | 6/2006 |
| WO | 2005/029406 A2 | 3/2005 |

OTHER PUBLICATIONS

A. M. Holler—Institute of Electrical and Electronics Engineers: "Optimization for a Superscalar Out-of-Order Machine", Proceedings of the 29$^{th}$ Annual IEEE/ACM International Symposium on Microarchitecture, Dec. 2-4, 1996, pp. 336-348.
European Search Report issued on Jan. 14, 2009 in corresponding European Patent Application No. 08168705.5.
Korean Office Action issued Jan. 7, 2010 in corresponding Korean Patent Application 10-2008-0120003.
Japanese Office Action issued Dec. 4, 2012 in corresponding Japanese Patent Application No. 2008-073434.

* cited by examiner

*Primary Examiner* — David H Malzahn
(74) *Attorney, Agent, or Firm* — Staas & Halsey LLP

(57) ABSTRACT

A single-precision floating-point data storing method for use in a processor including a register, which has a size that can store double-precision floating-point data, for storing double-precision floating-point data and single-precision floating-point data comprises writing input single-precision floating-point data to the high-order half of the register, and writing all zeros to the low-order half of the register if a single-precision floating-point data process is specified.

9 Claims, 18 Drawing Sheets

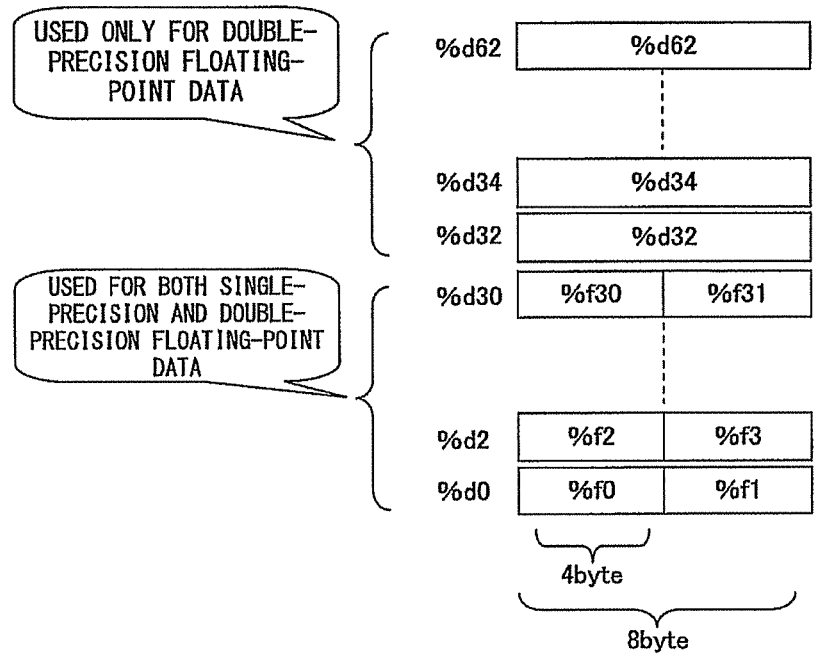
F I G. 1

| %d(2n) | Single data | All 0 |
|---|---|---|

63 32 31 0

F I G. 3

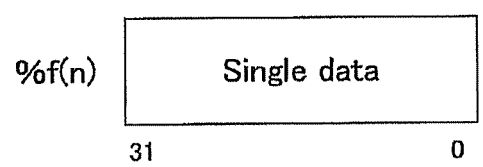
F I G. 4

| XAR | VAL | RD<7:5> | RS1<7:5> | RS2<7:5> | RS3<7:5> |

F I G. 5

SINGLE PRECISION FLOATING-POINT DATA STORING METHOD AND PROCESSOR

FIELD

The present invention relates to a processor and a single-precision floating-point data storing method for use in a processor.

BACKGROUND

To improve the performance of a processor, there is a bypass function that uses output data from an arithmetic unit as succeeding input data before the results of a preceding instruction are output from the arithmetic unit and written to a floating-point register when an arithmetic operation is performed by obtaining the input data of the arithmetic operation. Circuitry for detecting a dependency on the output of the preceding instruction is required to implement this bypass function.

In the meantime, a register address of a floating-point register, for example, in a SPARC-V9 (SPARC: registered trademark) architecture is 5 bits. Therefore, 32 instructions can be made. FIG. 1 shows a configuration of floating-point registers in the SPARC-V9 architecture. 32 single-precision floating-point registers (4 bytes) are represented as % f0, % f1, % f2, . . . , % f30, % f31, and 32 double-precision floating-point registers (8 bytes) are represented as % d0, % d2, % d4, . . . , % d62. For a double-precision floating-point register, its address can be specified only with an even number. The assignment of a double-precision floating-point register % d(n) ($0 \leq n \leq 30$) (8 bytes) corresponds to the merging of two single-precision floating-point registers % f(n) (4 bytes) and % f(n+1) (4 bytes).

Assume that a single-precision floating-point register is used as a 4-byte register and a double-precision floating-point register is used as an 8-byte register, into which two single-precision floating-point registers are merged, as in the SPARC-V9 architecture. For example, if an arithmetic operation for inputting double-precision floating-point data (8 bytes) to the register % d0 is performed, two output timings of the registers % f0 (4 bytes) and % f1 (4 bytes) must be detected to implement the above described bypass function. As a result, dependency detecting circuitry for the double-precision floating-point registers % d0 to % d30 requires a lot more circuitry amount than that required to only detect dependencies among 8-byte registers.

If the amount of circuitry increases in a processor, not only its cost performance but also its operating frequency drops. This leads to degradation in the performance of the processor. Accordingly, it is required to reduce the amount of circuitry in the processor as much as possible.

SUMMARY

An object of the present invention is therefore to reduce the amount of hardware that configures dependency detecting circuitry for implementing the bypass function as much as possible by proposing a new single-precision floating-point data storing method for use in a processor that handles single-precision floating-point data and double-precision floating-point data.

A single-precision floating-point data storing method for use in a processor including a register, which has a size that can store double-precision floating-point data, for storing double-precision floating-point data and single-precision floating-point data comprises writing input single-precision floating-point data to the high-order half of the register, and writing all zeros to the low-order half of the register if a single-precision floating-point data process is specified.

With the disclosed single-precision floating-point data storing method, single-precision floating point data can be handled with a double-precision floating-point register even when a single-precision floating-point data process is handled. Therefore, dependency detecting circuitry for double-precision floating-point registers can be used unchanged as dependency detecting circuitry for registers. Moreover, single-precision floating-point data is handled as alternative single-precision floating-point data, whereby the amount of data selection circuitry for an input register of an arithmetic unit can be significantly reduced. Accordingly, the amount of hardware within the processor can be reduced. As a result, the processor can be prevented from becoming complicated, whereby the operating frequency can be improved.

BRIEF DESCRIPTION OF DRAWINGS

FIG. 1 is a schematic diagram showing a configuration of floating-point registers of a SPARC-V9 architecture;

FIG. 3 is a schematic diagram showing a format of alternative single-precision floating-point data;

FIG. 4 is a schematic diagram showing a format of normal single-precision floating-point data;

FIG. 5 is a schematic diagram showing a configuration of an extended arithmetic register (XAR);

DESCRIPTION OF EMBODIMENTS

An embodiment according to the present invention is described below with reference to the drawings.

A processor according to the embodiment of the present invention is described first.

The configuration of the floating-point registers in the SPARC-V9 is described above. For the processor according to the embodiment of the present invention, floating-point registers are further extended.

Figure 2:
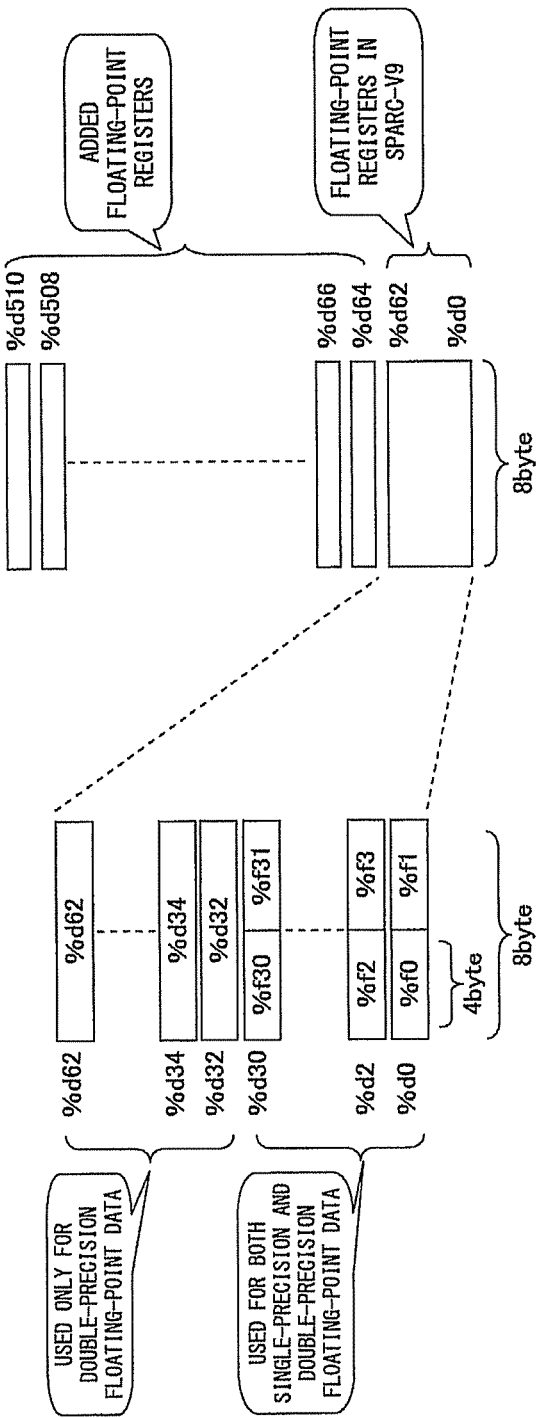
FIG. 2 is a schematic diagram showing an extended architecture of floating-point registers used in an embodiment of the present invention.

As shown in FIG. 2, a register named an extended arithmetic register (XAR) is updated by using an extended prefix instruction, and a region indicated by a floating-point register address is extended in this processor. Namely, the region of the floating-point register is extended by modifying an instruction to access the floating-point register with the extended prefix instruction. For example, the number of double-precision floating-point registers (8 bytes) is increased to 256 by adding 3 bits of the extended arithmetic register (XAR) as a floating-point register address, although its details will be described later.

If up to 256 double-precision floating-point registers % d0 to % d510 (specifiable only with even numbers) are made specifiable, and 256 single-precision floating-point registers % f0 to % f255 are made specifiable in units of 4 bytes in the processor having the floating-point register structure shown in FIG. 2, hardware circuitry for detecting dependencies of extended registers becomes extremely large.

A single-precision floating-point data storing method for use in the processor having the extended floating-point registers shown in FIG. 2 is described below. This method is described as an embodiment of the present invention. However, the present invention is not limited to the embodiment described below, and can be applied in a variety of ways within a scope that does not depart from the gist of the present invention as a matter of course. Namely, the single-precision floating-point data storing method according to the present invention may be implemented in a processor having any structure without being limited to the processor structure referred to in the embodiment.

Figure 3:
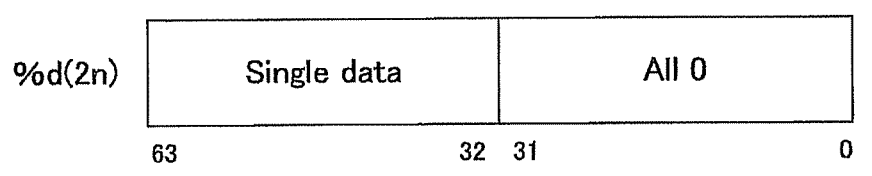

In this embodiment, it is defined that data is written to a destination register by storing single-precision floating-point data in the high-order 4 bytes of a register of an 8-byte length, which is a double-precision floating-point data length, and by storing all zeros in the low-order 4 bytes when a single-precision floating-point instruction is extended with an extended arithmetic register (XAR). Single-precision floating-point data stored in such a format is hereinafter referred to as alternative single-precision floating-point data. The format of the alternative single-precision floating-point data is shown in FIG. 3.

In contrast, single-precision floating-point data, 4 bytes of which are normally stored in a floating-point register, is hereinafter referred to as normal single-precision floating-point data. A format of the normal single-precision floating-point data is shown in FIG. 4.

As described above, single-precision floating-point data is configured to be storable as alternative single-precision floating-point data, namely, 8-byte data in this embodiment. As a result, a single-precision floating-point arithmetic operation can be performed by using the registers % d32 to % d62 that are conventionally defined in the SPARC-V9, and the registers % d64 to % d510 that are specified to be extended with the extended arithmetic register (XAR).

Additionally, also a register the address of which is smaller than % d32 is configured to be available as an 8-byte alternative single-precision floating-point data register in a similar manner when a single-precision floating-point instruction is modified with the extended arithmetic register (XAR). Namely, single-precision data is stored in the high-order 4 bytes of the registers % d0 to % d30 (of an 8-byte length, and only even number are specifiable), and all zeros are stored in their low-order 4 bytes.

Whether data is stored either as normal single-precision floating-point data by using the 4-byte 32 registers % f0 to % f31 or as alternative single-precision floating-point data is determined as follows.

Initially, an instruction named SXAR (Set XAR) for updating an extended arithmetic register (XAR) is defined in an instruction set.

Figure 5:
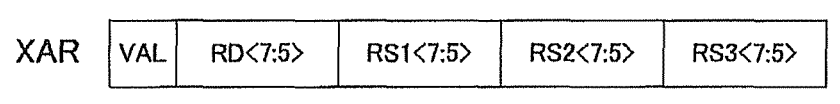

The extended arithmetic register (XAR) has a configuration shown in FIG. 5. VAL (valid bit) shown in FIG. 5 has a value of a 1-bit width, and indicates that the extended arithmetic register is valid if VAL is set to 1 (VAL=1). RD is a field for storing extended 3 bits of an address for specifying a destination register of an extended instruction. Moreover, RS1 to RS3 are respectively an address extended field for storing extended 3 bits of an address for specifying a source register. These 3 bits are used as the high-order 3 bits insufficient in an existing instruction in order to increase the number of floating-point registers to 256. Namely, 8-byte (double-precision) registers can be specified up to 256 by using an extended address and 5 bits of an operand register address of a floating-point instruction if VAL (valid bit) of the extended arithmetic register (XAR) is set to 1.

In such an XAR configuration, it can be determined that a single-precision floating-point process instruction is modified (extended) if VAL (valid bit) of the extended arithmetic register (XAR) is set to 1 by the above described SXAR instruction, or it can be determined that the single-precision floating-point process instruction is not modified if the valid bit is not set to 1.

Figure 6:
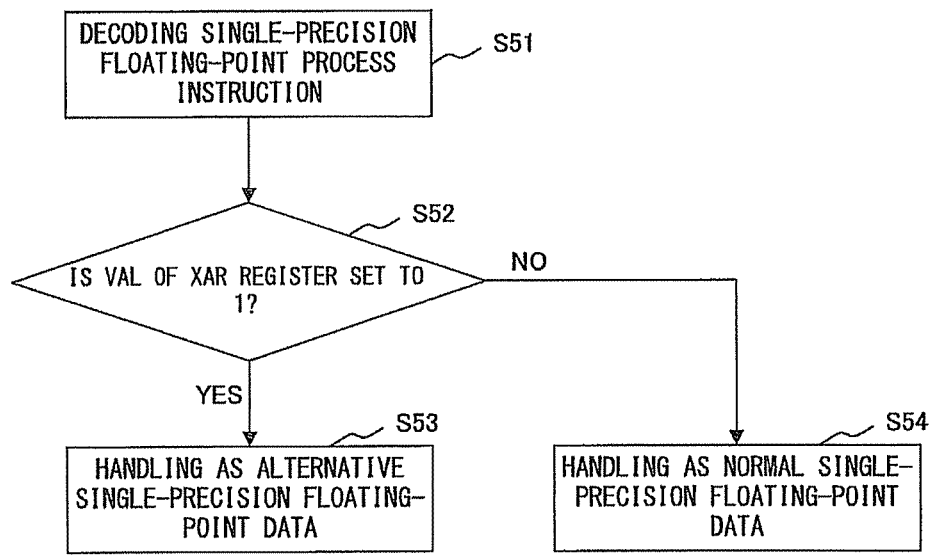
FIG. 6 is a flowchart showing a process for determining whether data is handled either as normal single-precision floating-point data or as alternative single-precision floating-point data.

FIG. 6 is a flowchart showing a process for determining whether data is stored either as normal single-precision floating-point data or as alternative single-precision floating-point data. Initially, a single-precision floating-point instruction is decoded in step S51. In step S52, it is determined whether or not VAL (valid bit) of the extended arithmetic register (XAR) is set to 1. If VAL is set to 1 ("YES") in step S52, the data is handled as alternative single-precision floating-point data by recognizing that floating-point registers are extended (step S53). Or, if VAL is set to 0 ("NO") in step S52, the data is handled as normal single-precision floating-point data (step S54).

For an extended register that is made specifiable by the extended arithmetic register (XAR), circuitry for detecting dependencies among registers in units of 8-byte data can be used as described above even when a single-precision floating-point data process is handled. Namely, the conventional register dependency detecting circuitry for double-precision floating-point data can be used, thereby eliminating the need for register dependency detecting circuitry in units of 4-byte data.

Additionally, an instruction decoding unit determines whether either a normal single-precision floating-point data process or a alternative single-precision floating-point data process is to be executed, for example, whether the generation of a register address or a register update is to be made either in units of 4 bytes or in units of 8 bytes. Therefore, an arithmetic processing unit, a load processing unit, and a store processing unit do not need to determine whether data is either normal single-precision floating-point data or alternative single-precision floating-point data. In the arithmetic processing unit, the load processing unit, and the store processing unit, data can be processed respectively with common circuitry. Accordingly, there is no need to add hardware for making this determination.

A single-precision floating-point register arithmetic process, load instruction process, and store instruction process, which are executed in the processor in this embodiment, are further described in detail below with reference to the drawings.

Figure 7:
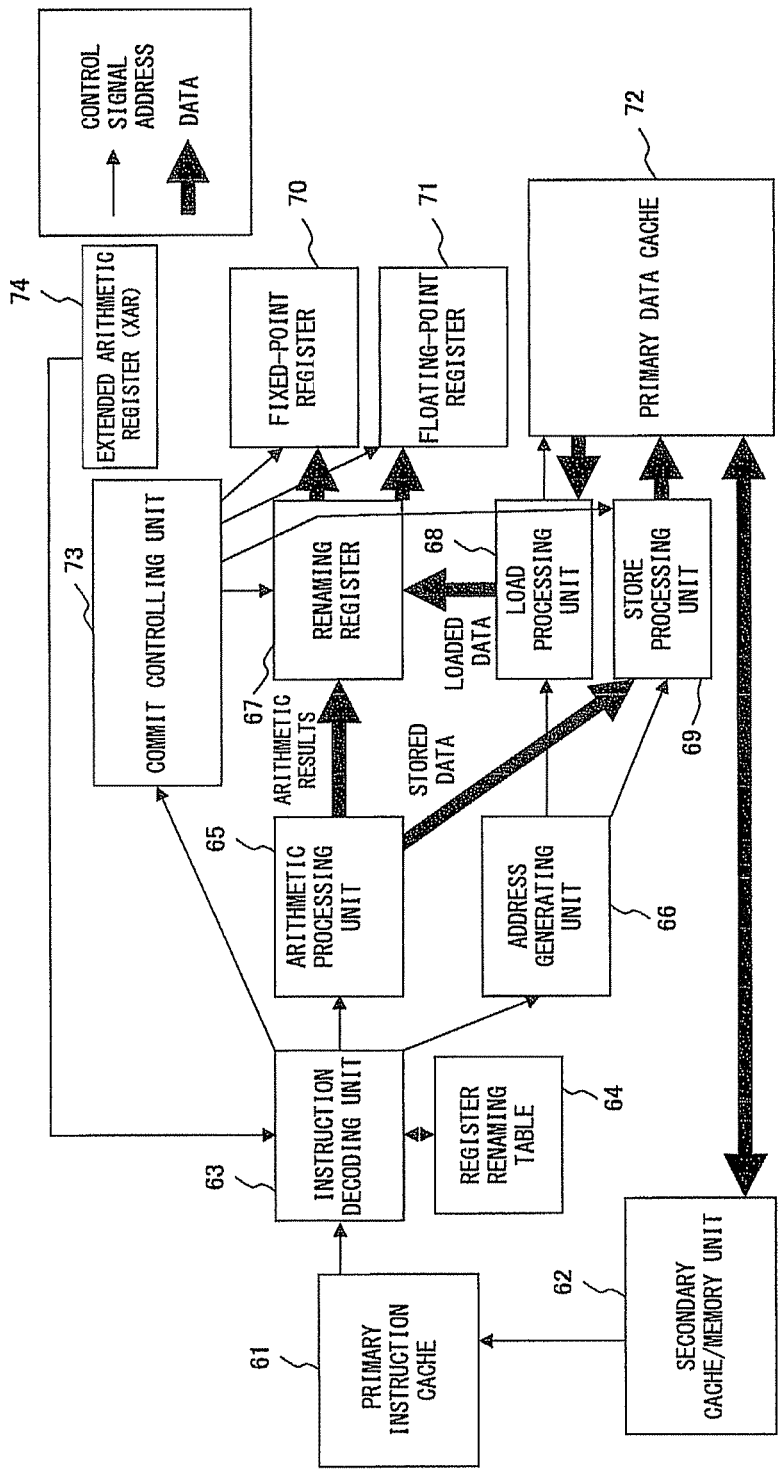
FIG. 7 is a block diagram showing a configuration of a processor.

A configuration of the processor is initially shown in FIG. 7.

The processor 60 includes a primary instruction cache 61, a secondary cache/memory unit 62, an instruction decoding unit 63, a register renaming table 64, an arithmetic processing unit 65, an address generating unit 66, a renaming register 67, a load processing unit 68, a store processing unit 69, a fixed-point register 70, a floating-point register 71, a primary data cache 72, a commit controlling unit 73, and an extended arithmetic register XAR 74.

The primary instruction cache 61 and the primary data cache 72 are cache memories, whereas the secondary cache/memory unit 62 is a normal memory or secondary cache memory. The fixed-point register 70 has a conventional configuration. The floating-point register 71 is extended with the extended arithmetic register XAR 74, and has a configuration shown in FIG. 2.

The instruction decoding unit 63 decodes an instruction. The register renaming table 64 is a circuit configured with a latch, and detects dependencies among registers. The arithmetic processing unit 65 is configured with an arithmetic unit for executing an arithmetic process. The address generating unit 66 generates from a decoded instruction an address to be accessed. The renaming register 67 is a register for temporarily holding results of the process executed by the arithmetic processing unit 65. The load processing unit 68 and the store processing unit 69 are circuits for respectively processing a load instruction and a store instruction. The commit controlling unit 73 controls a register update and a memory update. Moreover, single-precision floating-point data of an 8-byte length is handled as alternative single-precision floating-point data if a single-precision floating-point instruction is extended with the extended arithmetic register XAR 74. Note that all zeros are stored in the low-order 4 bytes of the alternative single-precision floating point data at the time of an update.

Figure 8:
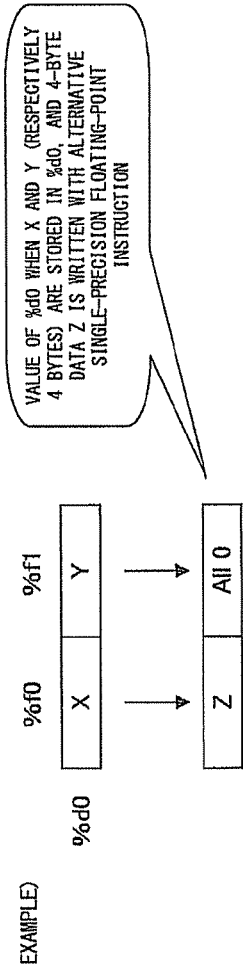
FIG. 8 is a schematic diagram for explaining a difference between an alternative single-precision floating-point instruction and a normal single-precision floating-point instruction.
Figure 8:
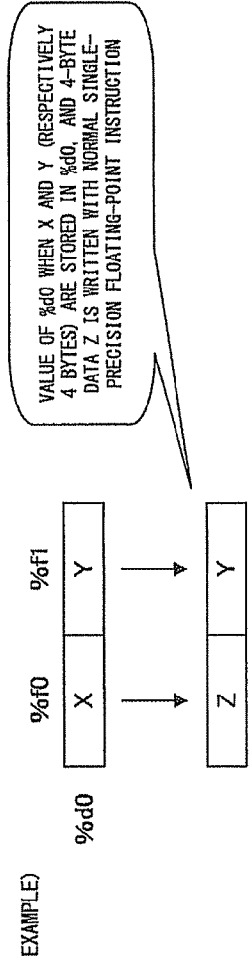

The case where data is written to the floating-point register % d0 with an alternative single-precision floating point instruction, and the case where data is written to the floating-point register % f0 with a normal single-precision floating-point instruction are exemplified in FIG. 8. Assume that single-precision floating point data Z is written in the state where % f0=X and % f1=Y are respectively prestored in the floating-point register % d0 (% f0 and % f1). In this case, % f0=Z and % f1="all 0s" if the data is written with the alternative single-precision floating-point instruction, or the register % f0 is updated to % f0=Z and the register % f1 is not updated and remains Y if the data is written with the normal single-precision floating-point instruction.

The normal single-precision floating-point arithmetic operation and load instruction and the alternative single-precision floating-point arithmetic operation and load instruction, which are intended to write single-precision floating-pint data to a floating-point register, are initially described.

Figure 9:
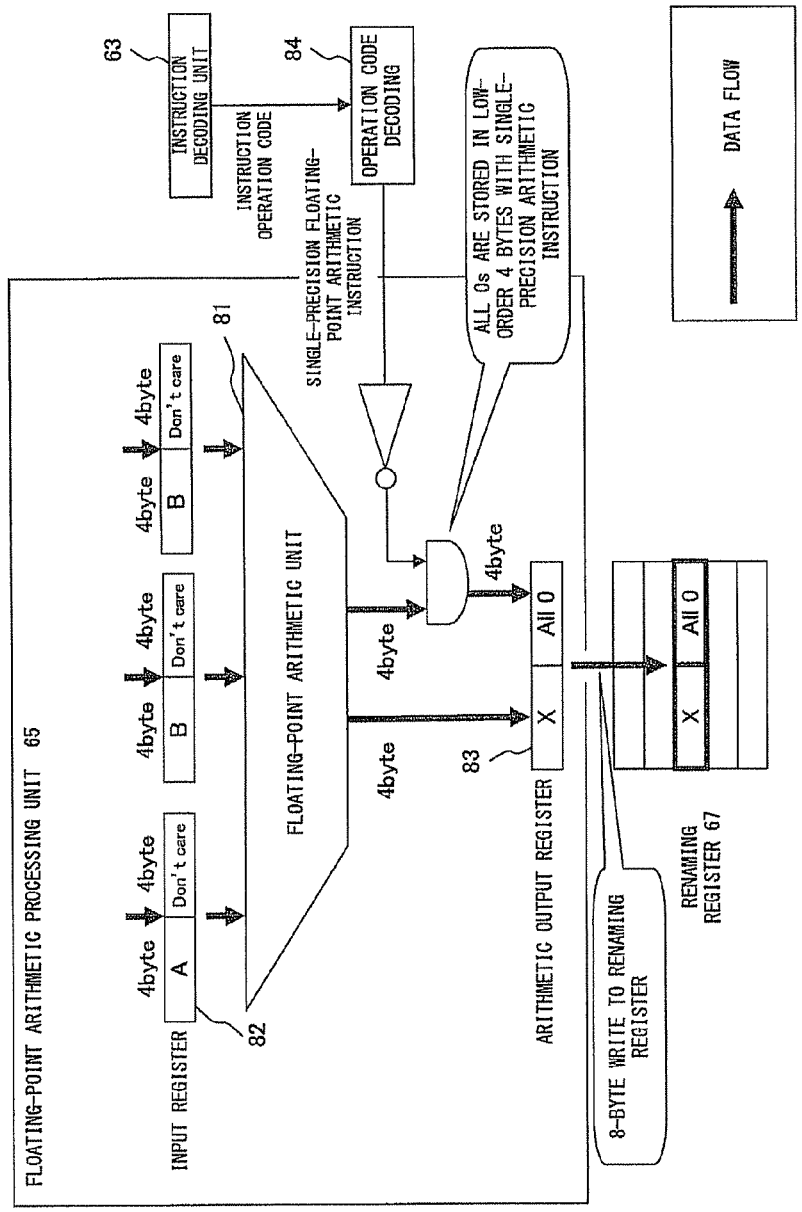
FIG. 9 is a schematic diagram showing the flow of data of an arithmetic processing unit for processing a single-precision floating-point arithmetic instruction.

FIG. 9 shows the flow of data of the arithmetic processing unit for processing a single-precision floating-point arithmetic instruction. As shown in this figure, in the floating-point arithmetic processing unit 65, an instruction operation code (opcode) is received from the instruction decoding unit 63 for controlling an instruction, and operation code decoding 84 is made for the instruction operation code. If the single-precision floating point arithmetic operation is instructed as a result of the decoding, a floating-point arithmetic unit 81 performs an arithmetic operation using only the high-order 4 bytes of data input from an input register 82, and ignores the low-order 4 bytes. Then, the floating-point arithmetic unit 81 outputs the results of the arithmetic operation as the high-order 4 bytes, and also outputs zeros as the low-order 4 bytes. These 8 bytes are once stored in an arithmetic output register 83, and written to the renaming register 67 in the next cycle.

Figure 10:
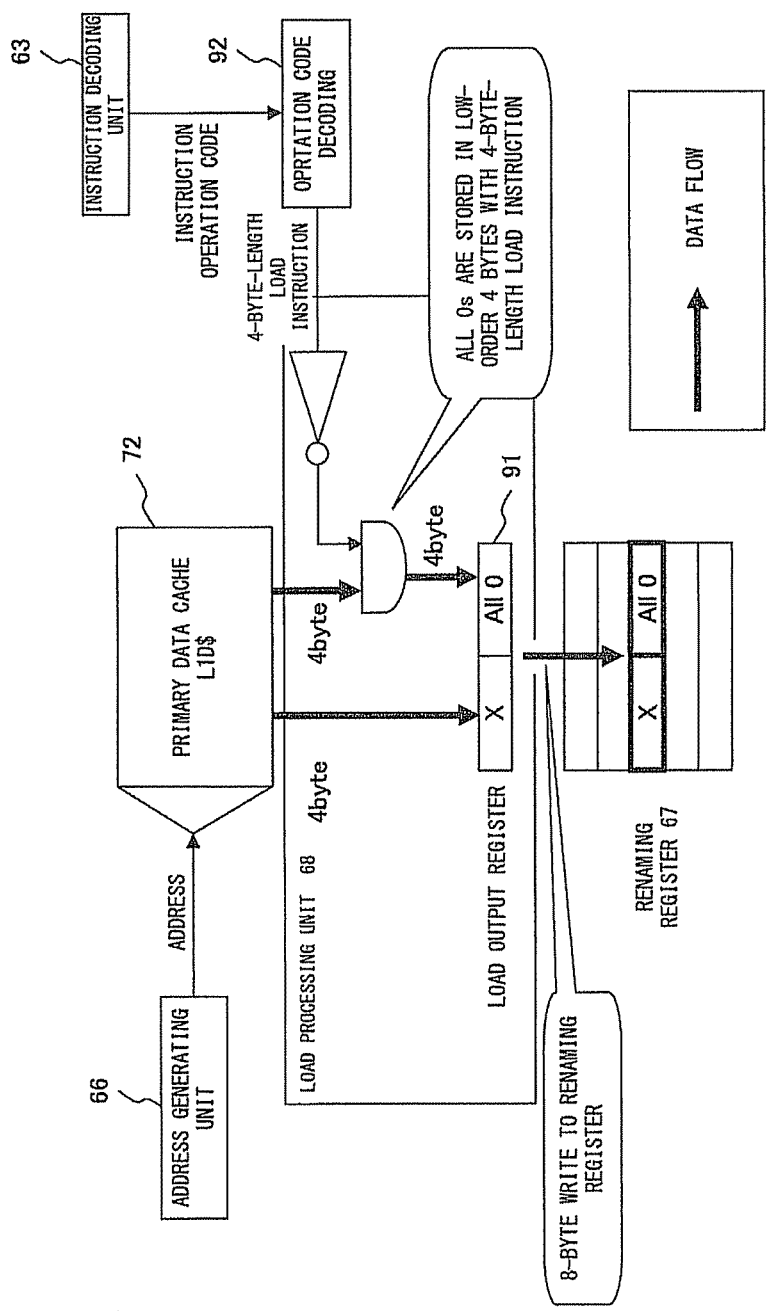
FIG. 10 is a schematic diagram showing the flow of data of a load processing unit for processing a single-precision floating-point load instruction.

The flow of data of the load processing unit for processing a single-precision floating-point load instruction is shown in FIG. 10. If an instruction to load data in units of 4 bytes is received from the instruction decoding unit 63 for controlling an instruction, the primary data cache 72 that loads data from the memory once stores the data of the cache memory in the high-order 4 bytes of a load output register 91, and also stores all zeros in the low-order 4 bytes as shown in FIG. 10. In the next cycle, the data of the total of 8 bytes is written from the load output register 91 to the renaming register 67 based on an address specified from the address generating unit 66.

The instruction decoding unit 63 decodes whether or not the single-precision floating-point instruction is modified with the extended arithmetic register XAR 74. The instruction decoding unit 63 generates and transmits the same operation code of the normal single-precision floating point instruction and the alternative single-precision floating point instruction to the arithmetic processing unit 65 shown in FIG. 9 and the load processing unit 68 shown in FIG. 10. These processing units respectively receive this operation code and execute their single-precision floating-point processes. As far as the processing units respectively execute the single-precision floating-point arithmetic and load processes shown in FIGS. 9 and 10, they do not need to execute their processes by making a determination between the normal single-precision floating-point process and the alternative single-precision floating-point process.

A control of whether either the normal single-precision floating-point process or the alternative single-precision floating-point process is to be executed is performed by the instruction decoding unit 63.

The case where normal single-precision floating-point data, namely, 4 bytes are written, and the case where alternative single-precision floating-point data, namely, 8 bytes are written are respectively shown in FIGS. 11 and 12, and described with reference to these figures.

The instruction decoding unit 63 instructs the commit controlling unit 73, which issues a register update instruction, of a 4-byte write to the floating-point register 71 in the case of a normal single-precision floating-point arithmetic instruction or a normal single-precision floating-point load instruction, which updates a floating-point register. In contrast, the instruction decoding unit 63 instructs the commit controlling unit 73 of an 8-byte write to a floating-point register 71 in the case of a alternative floating-point arithmetic instruction or a alternative floating-point load instruction (or a double-precision floating-point arithmetic instruction or a double-precision floating-point load instruction). The instruction of the 8-byte write is the same as that of the conventional process for writing double-precision floating-point data in both of the commit controlling unit and the register file unit.

Figure 11:
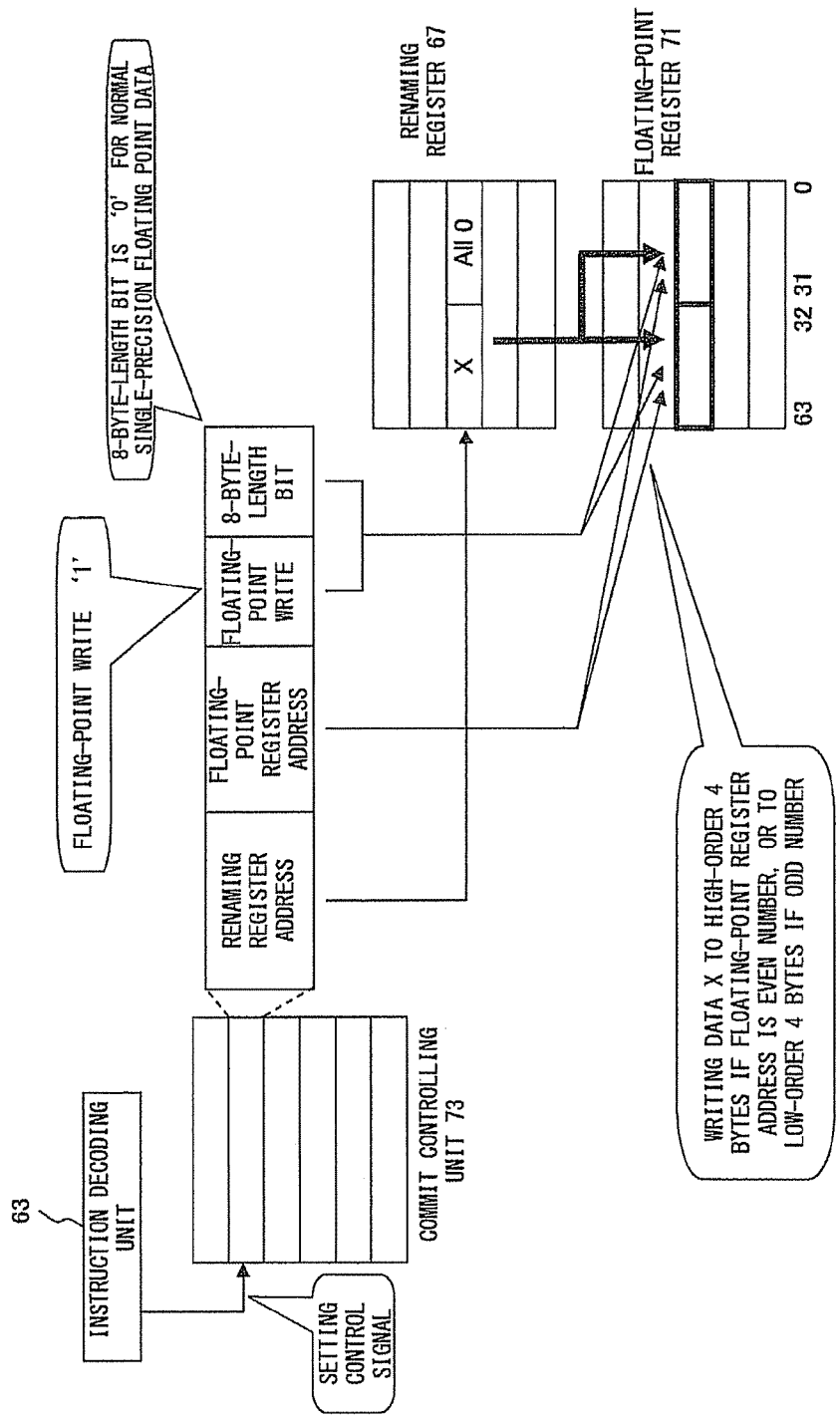
FIG. 11 is a schematic diagram for explaining a process for updating a floating-point register at the time of commitment in a normal single-precision floating-point data process.
Figure 12:
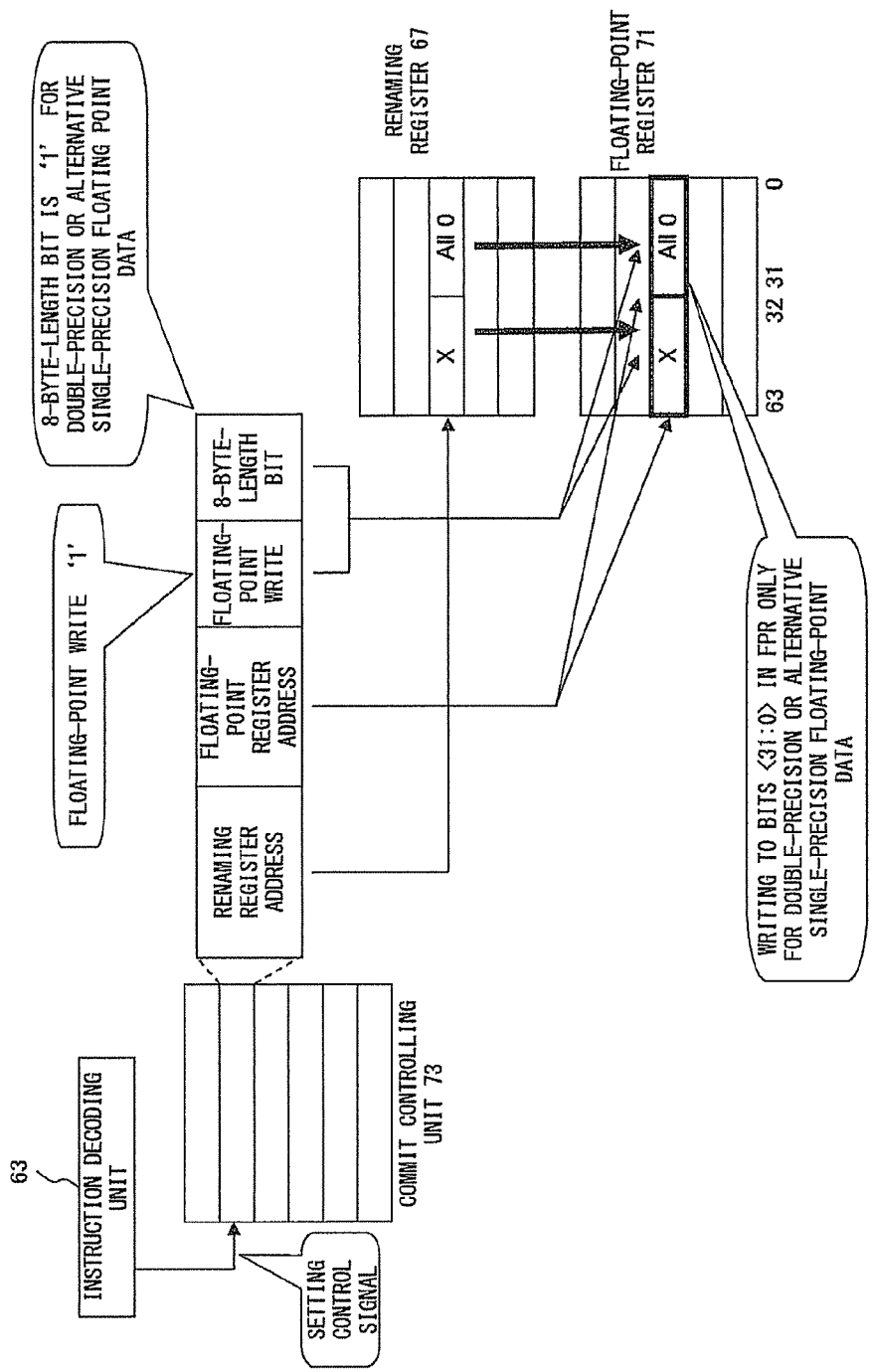
FIG. 12 is a schematic diagram for explaining a process for updating a floating-point register at the time of commitment in an alternative single-precision floating-point data process.

The commit controlling unit 73 has 1 bit for recording these instructions, namely, whether either a 4-byte write or an 8-byte write is to be made to the floating point register (an 8-byte-length bit shown in FIGS. 11 and 12). Based on the information of this 1 bit, data of the specified length is written from the high-order bytes of the renaming register 67, which stores results of an arithmetic operation or loaded results, to the floating-point register when an instruction is committed.

In the portion of FIG. 11 where the elements of the commit controlling unit 73 are enlarged, a floating-point write bit='1', and the 8-byte-length bit='0'. If the address of a floating-point register to be written is an even number, data of the high-order 4 bytes of the renaming register 67 is written to the high-order 4 bytes of an 8-byte floating-point register. Alternatively, if the address of the floating-point register to be written is an odd number, data of the high-order 4 bytes of the renaming register 67 is written to the low-order 4 bytes of the 8-byte floating-point register.

Additionally, in the portion of FIG. 12 where the elements of the commit controlling unit 73 are enlarged, the floating-point write bit='1', and the 8-byte-length bit='1'. Data of the high-order 4 bytes of the renaming register 67 is written to the high-order 4 bytes of an 8-byte floating-point register to be written, and data of the low-order 4 bytes of the renaming register 67 is written to the low-order 4 bytes of the 8-byte floating-point register.

The normal single-precision floating-point store instruction and the alternative single-precision floating-point store instruction, which write single-precision floating-point data to the cache memory, are described next.

Figure 13:
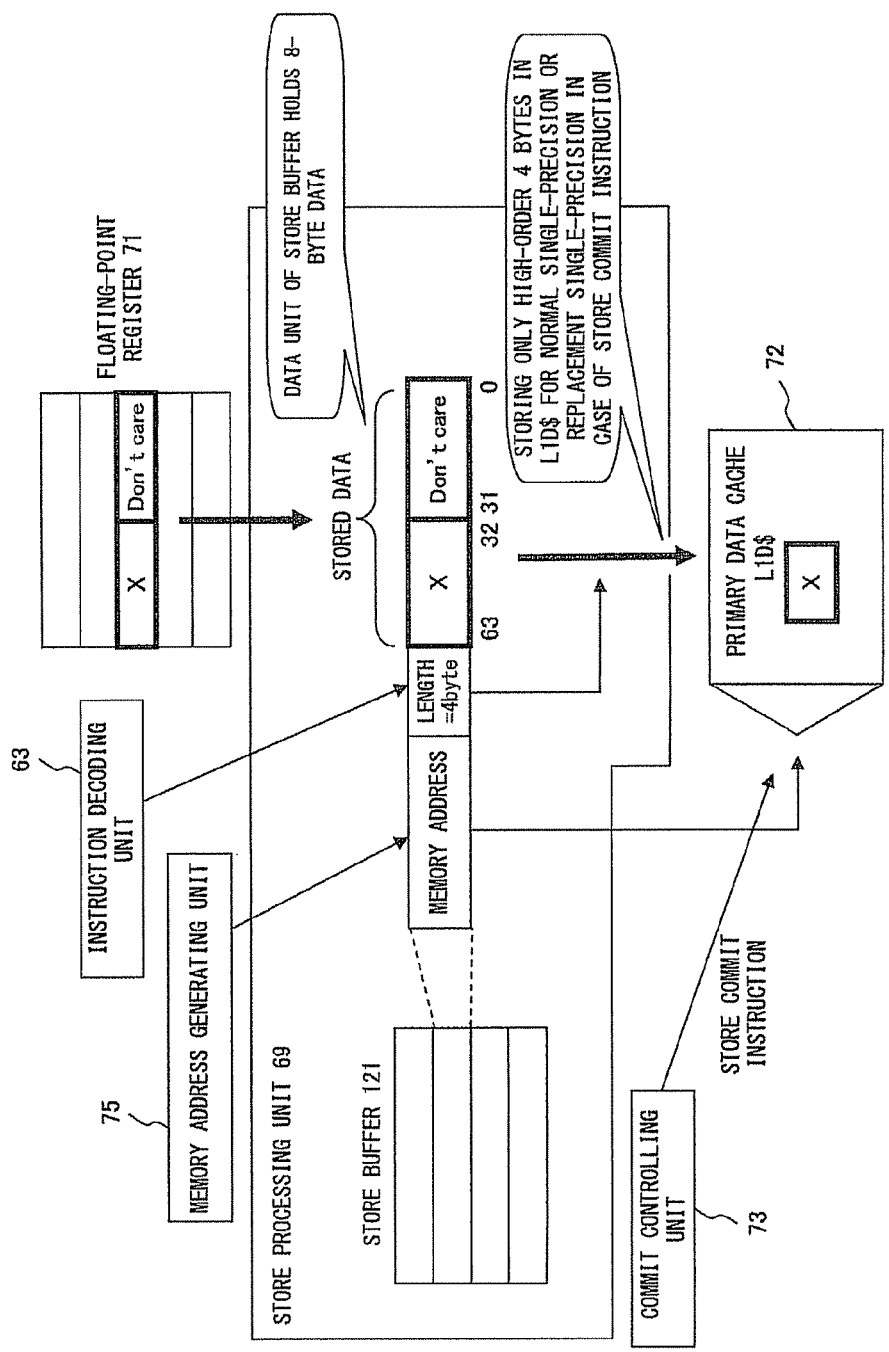
FIG. 13 is a schematic diagram showing the flow of data of a store processing unit for processing a single-precision floating-point store instruction.

The flow of data of the store processing unit 69 for processing the single-precision floating-point store instruction is shown in FIG. 13. Also in the store processing unit 69, a common process is executed regardless of whether a store instruction is either the normal single-precision floating-point store instruction or the alternative single-precision floating-point store instruction. Namely, in response to the single-precision floating-point store instruction, the store processing unit 69 reads stored data from the floating-point register 71, and aligns and writes 4-byte data to be stored to the high-order 4 bytes of a store buffer 121, which is assigned for each store instruction and exists in the store processing unit 69. The low-order 4 bytes of the stored data may be any data since these bytes are ignored when being written to the cache.

The memory address generating unit 75 generates a memory address, and transmits the generated address to the store processing unit 69.

The instruction decoding unit 63 decodes both the normal single-precision floating-point store instruction and the alternative single-precision floating-point store instruction, which write single-precision floating-point data to the cache memory, by setting the length of a write to the cache memory to 4 bytes. To the store buffer 121, an address for storing data is transmitted, and at the same time, the store length information (4 bytes) is transmitted. A store commit instruction signal, which is common to the normal single-precision floating-point store instruction and the alternative single-precision floating-point store instruction, is transmitted from the commit controlling unit 73 to the store processing unit 69 when the store instruction is committed. In accordance with this instruction, the store processing unit 69 executes the process for writing the high-order 4 bytes of stored data to the cache memory (primary data cache 72). When the single-precision floating-point store instruction is processed, the same operations are performed without making a determination between the normal single-precision floating-point store instruction and the alternative single-precision floating-point store instruction in the store processing unit 69 and the commit controlling unit 73 as described above. Whether an instruction is either the normal single-precision floating-point store instruction or the alternative single-precision floating-point store instruction depends on the way of generating a register address to be read.

Generation of a register address, which is made by the instruction decoding unit 63, is described next. The generation of a register address is common to all the single-precision floating-point instructions (arithmetic instruction, load instruction, and store instruction) modified with the extended arithmetic register (XAR). Additionally, the instruction decoding unit 63 generates not only a register address for the single-precision floating-point instruction modified with the extended arithmetic register XAR 74 but also a register address for the normal single-precision floating-point instruction.

Figure 14:
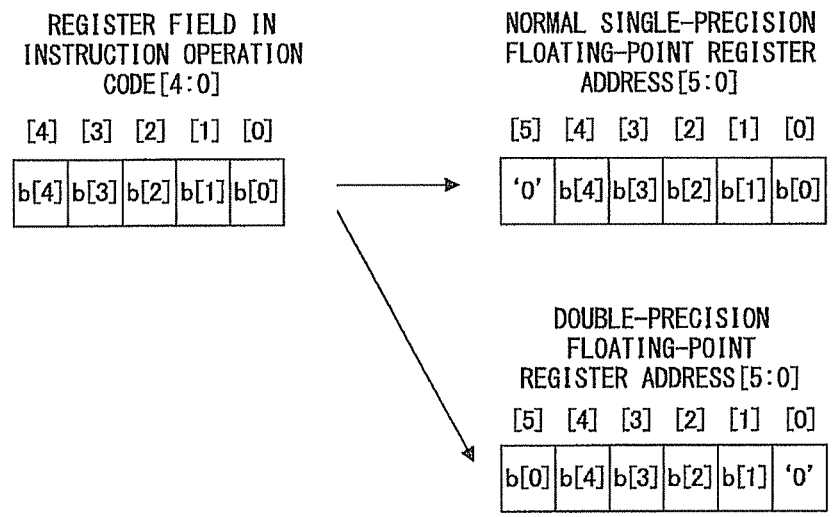
FIG. 14 is a schematic diagram for explaining the generation of a register address in the SPARC-V9 architecture.

FIG. 14 is a schematic diagram for explaining the generation of a register address in the SPARC-V9 architecture. This figure shows correspondences between a register address field of an operation code (opcode) and a register address number. A register address is generated based on these correspondences. For the SPARC-V9 architecture, a difference exists between the bit assignment of a register address indicated by the 5-bit register address field in the instruction operation code (opcode) in the single-precision floating-point register and that in the double-precision floating-point register. If the normal single-precision floating-point register is used, the register address field of the instruction operation code (opcode) and an instructed register number match, and the number indicates from 0 to 31. For an instruction using the double-precision floating-point register, the bit [0] of the register address field is moved to the register address bit [5], and the register address bit [0] is always set to 0. Namely, a double-precision floating-point register address can be instructed only with an even number, which ranges from 0 to 62.

Figure 15:
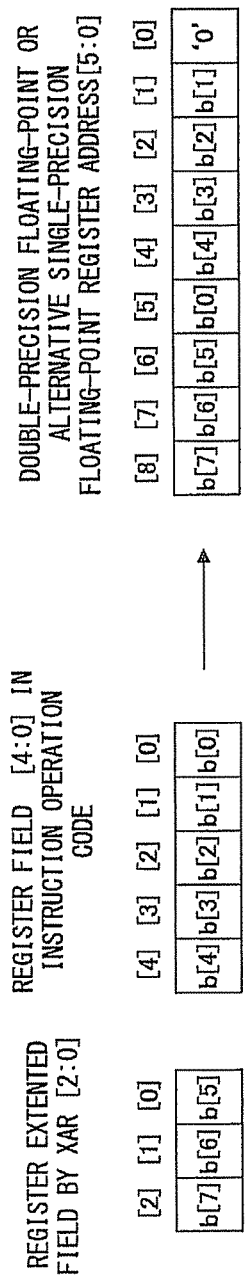
FIG. 15 is a schematic diagram for explaining the generation of a register address when alternative single-precision floating-point data is handled.

FIG. 15 is a schematic diagram for explaining the generation of a register address when alternative single-precision floating-point data is handled. Whether or not the alternative single-precision floating-point data is handled is determined depending on whether or not the valid bit of the extended arithmetic register XAR 74 is set to 1 as shown in FIG. 6. If the alternative single-precision floating-point data of 8 bytes, in which all zeros are stored in the low-order 4 bytes when being updated, is handled, input and output data are handled as single-precision floating-point data in the arithmetic processing unit 65, the load processing unit 68, and the store processing unit 69 as described above. However, if a conversion is made from the register address field of the instruction operation code to a physical register address, this conversion is made in accordance with a conversion method of a double-precision floating-point register. Namely, for alternative single-precision floating-point, a register address is instructed only with an even number. In the processor shown in FIG. 2, the registers are extended up to 256, and the register addresses from 0 to 510 (only even numbers) can be specified.

As described above, the instruction decoding unit 63 generates a register address when normal single-precision floating-point data is handled, and also generates a register address when alternative single-precision floating-point data is handled.

The operations of the processor in this embodiment, which are performed in accordance with the single-precision floating-point arithmetic instruction, the single-precision floating-point load instruction, and the single-precision floating-point store instruction, have been described.

A mechanism for detecting a data dependency between instructions is described next.

Figure 16:
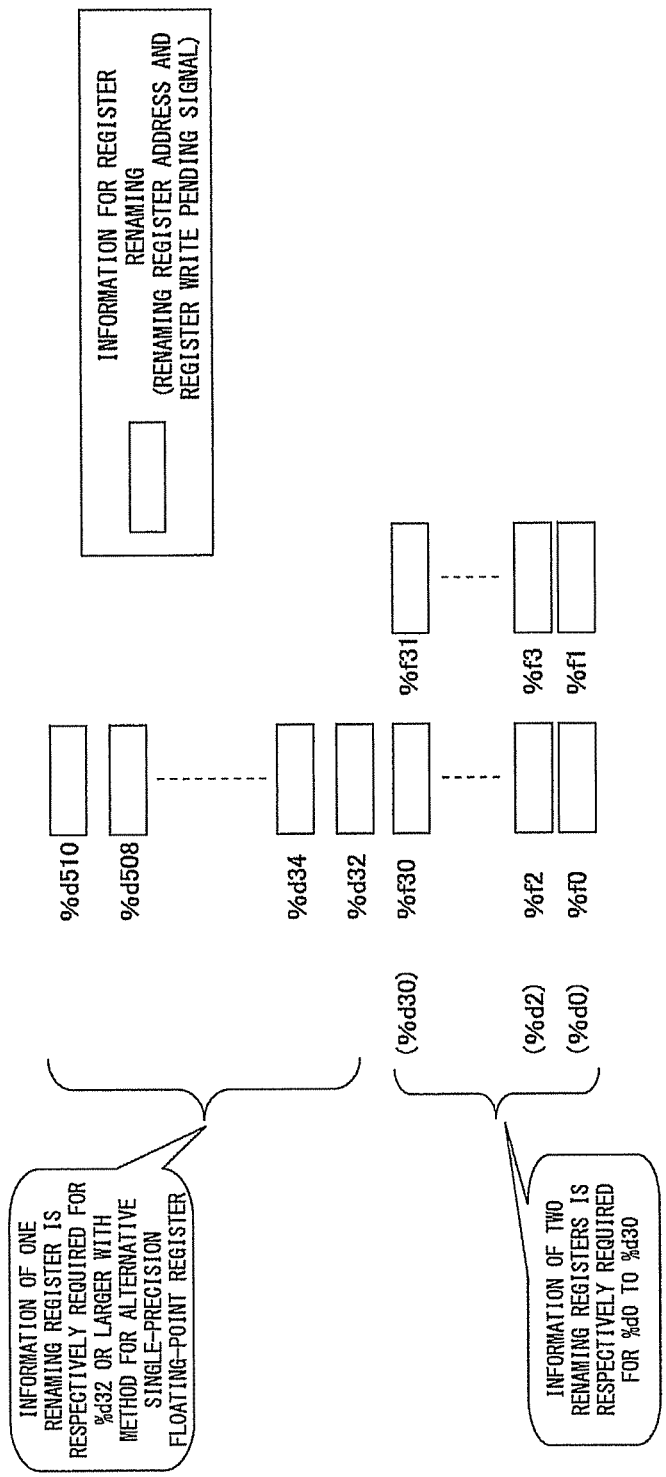
FIG. 16 is a schematic diagram showing a configuration of a register renaming table.

A configuration of the register renaming table is shown in FIG. 16.

In a processor that executes an out-of-order process, register renaming for detecting dependencies among registers is made. Register renaming must be made in units of 4 bytes for the normal single-precision arithmetic instruction that updates a floating-point register, or register renaming must be made in units of 8 bytes for the alternative floating-point arithmetic instruction. For register renaming, 1 bit indicating whether or not each register is in a write pending state, and a table for holding the latest addresses of renamed renaming registers are required. Generally, this table must be referenced and updated at high speed in a processor. Therefore, this table is configured with a latch circuit in a position close to the instruction decoding circuit. Reductions in the scale of circuitry associated with a reference and an update of this table that is configured with the latch circuit greatly contribute to improve the operating frequency of the processor. In the SPARC-V9 architecture, the registers %f0 to %f31, namely, %d0 to %d30 must be assigned with renaming register numbers of 4-byte-length registers, and a table for holding the renaming register numbers of the 32 registers %d0 to %d30 is required. In the meantime, the registers %d32 to %d510 are assigned with renaming register numbers of 8-byte-length registers. Therefore, a table for holding the renaming register numbers of the 240 registers is required. This is because the registers %d32 to %d510 are managed in units of 8 bytes by recognizing single-precision floating-point data as alternative single-precision floating-point data. If it is defined that the registers are managed by using normal single-precision floating-point data of a 4-byte length and single-precision floating-point registers range from %f0 to %f255, a table for holding 224 renaming register numbers is required only for the registers %f32 to %f255.

Namely, if single-precision floating-point data is handled as alternative single-precision floating-point data, the single-precision floating-point data can be stored in an extended register portion, and at the same time, dependency detecting circuitry for double-precision floating-point registers can be used for the register renaming table. Accordingly, there is no need to add hardware.

Additionally, if single-precision floating-point data is handled as alternative single-precision floating point data, also selection circuitry for input data to the arithmetic unit can be reduced. A general processor performs a data bypass control for obtaining input data of an arithmetic operation not only from a register but from output results of the arithmetic unit before being written to the register in order to quickly start to execute an arithmetic process.

Figure 17:
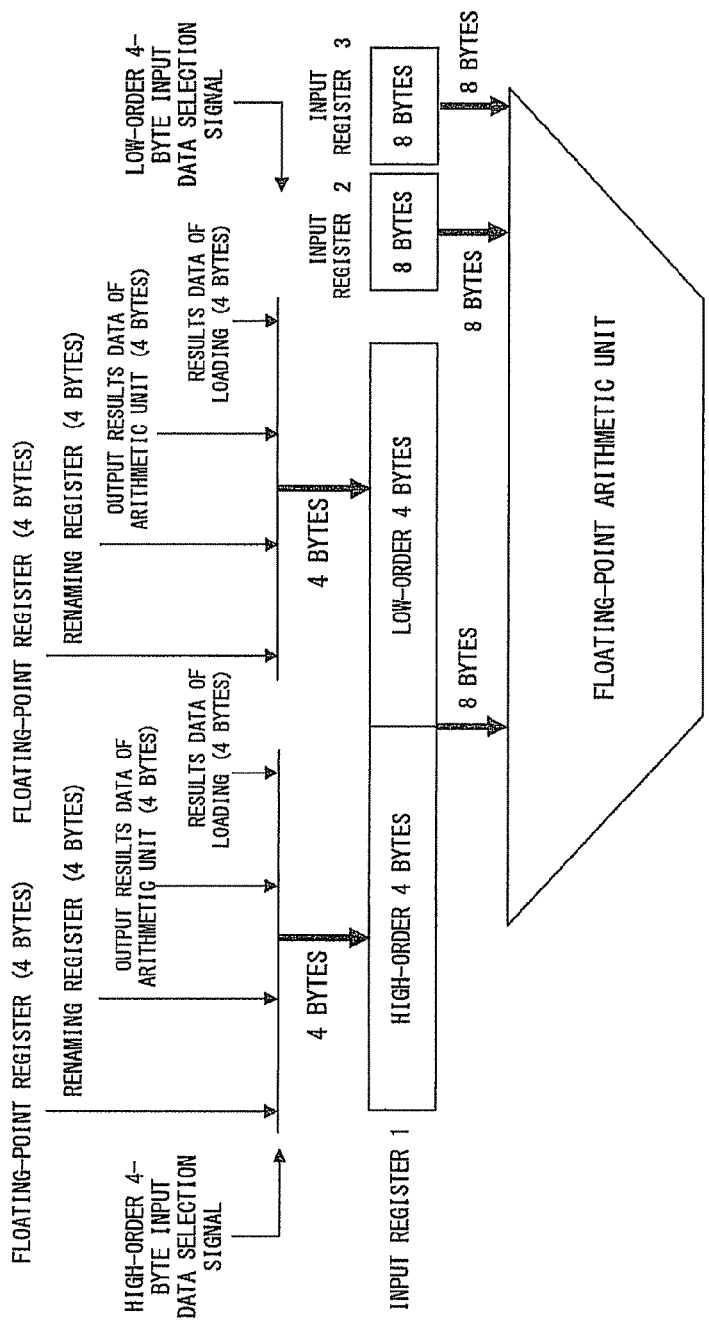
FIG. 17 is a schematic diagram showing circuitry for bypassing data to an arithmetic unit when data is managed in units of 4 bytes.
Figure 18:
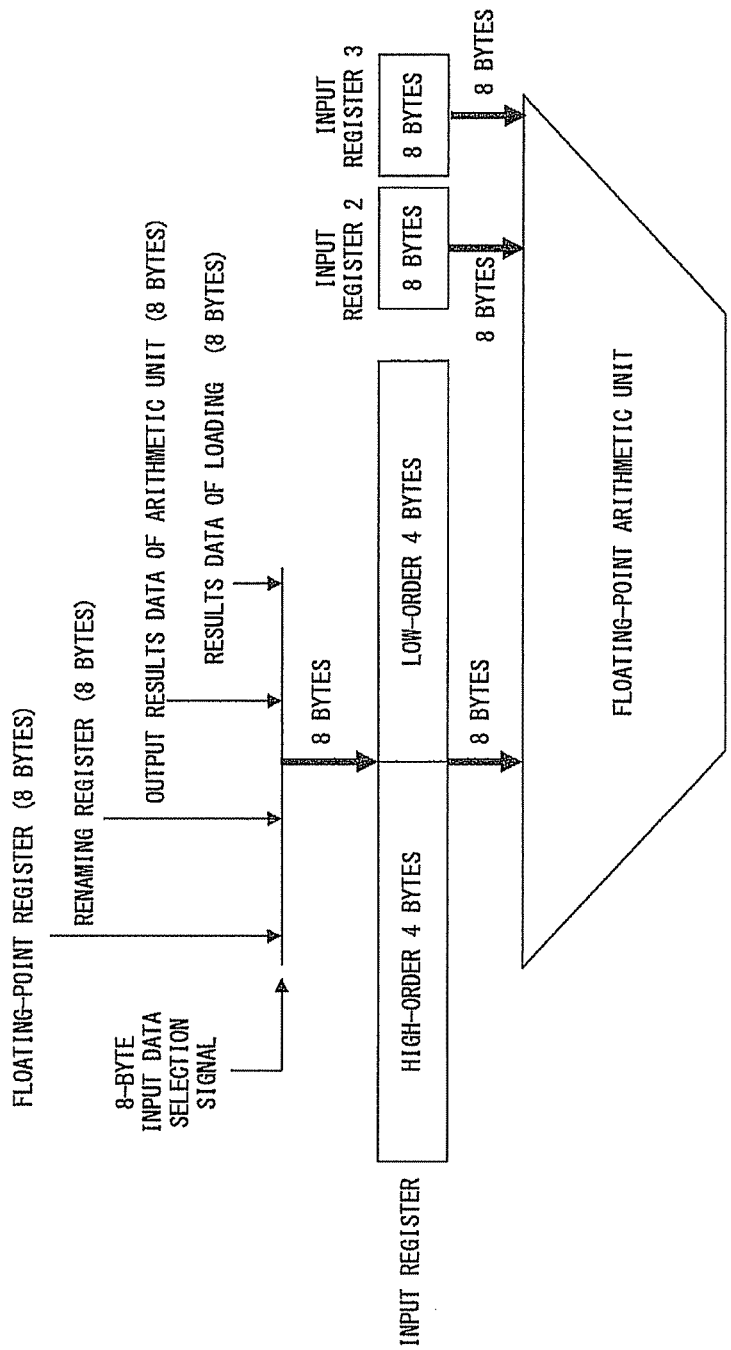
FIG. 18 is a schematic diagram showing circuitry for bypassing data to the arithmetic unit when data is managed in units of 8 bytes.

A data bypass circuit for the arithmetic unit when data is managed in units of 4 bytes, and a data bypass circuit for the arithmetic unit when data is managed in units of 8 bytes are respectively shown in FIGS. 17 and 18. These figures respectively show a configuration where one of three input registers of the arithmetic unit is enlarged and displayed, and input data is selected from among any of the floating-point register, the renaming register, output results of the arithmetic unit, and results data of loading.

When an 8-byte double-precision floating-point arithmetic instruction is executed, 8-byte data must be used as input data. Depending on a program, a double-precision floating-point arithmetic operation and a single-precision floating-point arithmetic operation are sometimes mixed.

Assuming that single-precision floating-point data is managed in units of 4 bytes, a program must be designed to update the single-precision floating-point registers %f0 and %f1 and to make the double-precision floating-point register %d0 readable immediately after the update. Namely, input data must be selected in units of 4 bytes in order to properly perform the data bypass control with hardware even when data of the high-order 4 bytes and the low-order 4 bytes are output from different sources (for example, the high-order 4 bytes are obtained from the output results of the arithmetic unit, and the low-order 4 bytes are obtained from the floating-point register). Therefore, this circuit is required respectively for the high-order and the low-order 4 bytes. FIG. 17 shows this configuration.

In the meantime, when single-precision floating-point data is managed in units of 8 bytes, data of the high-order 4 bytes and that of the low-order 4 bytes are not handled separately. Therefore, a data bypass process for the merged 8 bytes may be executed (FIG. 18).

By handling single-precision floating-point data as alternative single-precision floating-point data in this way, the amount of the data selection circuitry for the input register of the arithmetic unit can be significantly reduced.

As described above, with the single-precision floating-point register (data?) storing method according to this embodiment, single-precision floating-point data can be handled with a double-precision floating-point register even when a single-precision floating-point data process is handled. As a result, the dependency detecting circuitry for double-precision floating-point registers can be used as the circuitry for detecting dependencies among registers. This can eliminate the need for adding a hardware circuit.

Additionally, the instruction decoding unit determines whether either the normal single-precision floating-point data process or the alternative single-precision floating-point data process is to be executed, for example, whether the generation of a register address or a register update is to be made either in units of 4 bytes (single-precision floating-point data length) or in units of 8 bytes (alternative single-precision floating-point data length). Moreover, in the arithmetic processing unit, the load processing unit, and the store processing unit, the completely common circuitry can process two types of instructions such as a normal single-precision floating-point instruction and a alternative single-precision floating-point instruction(???) without making a determination between normal single-precision floating-point data and alternative single-precision floating-point data.

Furthermore, by handling single-precision floating-point data as alternative single-precision floating-point data, the amount of the data selection circuitry for the input register of the arithmetic unit can be significantly reduced.

As described above, with the single-precision floating-point data storing method according to this embodiment, the amount of hardware of the processor can be reduced. Since hardware circuitry does not become complicated, the operating frequency of the processor can be improved, which can contribute to improvements in the performance of the processor.

Additionally, single-precision floating-point data is held in the memory in units of 4 bytes in the floating-point load and store processes regardless of whether the instruction is either the normal single-precision floating-point instruction or the alternative single-precision floating-point instruction. Also input and output data of a program, which are existing single-precision floating-point data, can be processed.

Up to this point, the embodiment according to the present invention has been described in detail. However, the present invention is not limited to the above described embodiment. Applying the single-precision floating-point data storing method according to this embodiment to the processor in which the floating-point register region is extended has been described. However, this method may be applied to a processor having any configuration without being limited to the processor in which the floating-point register region is extended.

As described above, with the single-precision floating-point data storing method according to the present invention, single-precision floating-point data can be handled with an 8-byte double-precision floating-point register even when a single-precision floating-point data process is handled. Therefore, the dependency detecting circuitry for double-precision floating-point registers can be used unchanged as the register dependency detecting circuitry for registers. This eliminates the need for adding hardware as the dependency detecting circuitry.

What is claimed is:

1. A single-precision floating-point data storing method for use in a processor including a register, which has a size that can store double-precision floating-point data, configured to store double-precision floating-point data and single-precision floating-point data, comprising:
    writing input single-precision floating-point data to a high-order half of the register, and writing all zeros to a low-order half of the register when a single-precision floating-point data process is specified and a first process is specified; and
    writing input single-precision floating-point data to the high-order half of the register, and writing no data to the low-order half of the register when the single-precision floating-point data process is specified and a second process is specified,
    wherein
    whether the writing the input single-precision floating point data to the high-order half of the register is the first process or the second process is determined based on results of decoding of an instruction.

2. The single-precision floating-point data storing method according to claim 1 further comprising
    storing the input single-precision floating point data in a renaming register before the input single-precision floating point data is written to the high-order half of register, wherein
    in the writing the input single-precision floating-point data to the high-order half of the register and the writing all zeros to the low-order half of the register, the stored data of the renaming register is written to the high-order half of the register,
    the writing the input single-precision floating-point data to the high-order half of the register and the writing no data to the low-order half of the register are executed when a write destination address of the register, which is included in the results of the decoding, is an even number and then data of a high-order half of the renaming register is written to the high-order half of the register, and
    the data of the high-order half of the renaming register is written to the low-order half of the register when the write destination address of the register is an odd number, even when the single-precision floating-point data process is specified and the second process is specified.

3. A processor comprising:
    a register, which has a size that can store double-precision floating-point data, configured to store double-precision floating-point data and single-precision floating-point data;
    a decoder configured to perform decoding of an instruction; and
    a controlling unit configured to perform writing input single-precision floating-point data to a high-order half of the register, and writing all zeros to a low-order half of the register when a single-precision floating-point data process is specified and a first process is specified, or writing input single-precision floating-point data to the high-order half of the register, and writing no data to the low-order half of the register when the single-precision floating-point data process is specified and a second process is specified,
    wherein whether the writing the input single-precision floating point data to the high-order half of the register is the first process or the second process is determined based on results of decoding of an instruction.

4. The processor according to claim 3, further comprising:
    a renaming register configured to store the input single-precision floating point data in a renaming register before the input single-precision floating point data is written to the high-order half of register; and
    a commit controlling unit configured to set a control signal of the instruction decoded by the decoder and a write destination address of the register, and to commit storage of the data, which is stored in the renaming register, in the register, wherein
    the controlling unit writes the input single-precision floating-point data to the high-order half of the register and the writing all zeros to the low-order half of the register, the stored data of the renaming register is written to the high-order half of the register,
    the controlling unit writes the input single-precision floating-point data to the high-order half of the register and writes no data to the low-order half of the register are executed when a write destination address of the register, which is included in the results of the decoding, is an even number and then writes data of a high-order half of the renaming register to the high-order half of the register, and writes the data of the high-order half of the renaming register to the low-order half of the register when the write destination address of the register is an odd number, even when the single-precision floating-point data process is specified and the second process is specified.

5. The processor according to claim 3, further comprising a second register configured to specify the first process or the second process and configured to hold information of the specified process.

6. The processor according to claim 5, wherein
    the second register is an extended arithmetic register, and whether a process is either the first process or the second process is determined depending on whether or not the extended arithmetic register is valid.

7. The processor according to claim 5, further comprising wherein
    when the decoder decodes the instruction for instructing a single-precision floating-point arithmetic process or a single-precision floating-point load/store process, a read/write register address is instructed in units of single-precision floating-point data or in units of double-precision floating-point data based on specification of the second register.

8. The processor according to claim 5, further comprising:
an arithmetic processing unit configured to execute an arithmetic process; and
a load processing unit configured to execute a load process, wherein
the decoder transmits a common operation code to the arithmetic processing unit and the load processing unit correspondingly to the first process and the second process when decoding an instruction for instructing a single-precision floating-point arithmetic process or a single-precision floating-point load process, and
the arithmetic processing unit and the load processing unit output results to the high-order half of the register, and output all zeros to the low-order half.

9. The processor according to claim 5, further comprising:
an arithmetic processing unit configured to execute an arithmetic process; and
a store processing unit configured to execute a store process, wherein
the decoder transmits a common operation code to the arithmetic processing unit and the store processing unit correspondingly to the first process and the second process when decoding an instruction for instructing a single-precision floating-point arithmetic process or a single-precision floating-point store process, and
the arithmetic processing unit and the store processing unit respectively execute an arithmetic process and a store process by using only data of a length of the high-order half of the register as an input.

* * * * *